United States Patent [19]

Teslovich

[11] Patent Number: 4,728,750
[45] Date of Patent: Mar. 1, 1988

[54] RECEPTABLE SUPPORT ASSEMBLY
[75] Inventor: John L. Teslovich, Pittsburgh, Pa.
[73] Assignee: H. H. Robertson Company, Pittsburgh, Pa.
[21] Appl. No.: 16,950
[22] Filed: Feb. 20, 1987
[51] Int. Cl.$^4$ .............................................. H02G 3/18
[52] U.S. Cl. ..................................................... 174/48
[58] Field of Search ........................ 174/48, 49; 52/221

[56] References Cited
U.S. PATENT DOCUMENTS

| | | | |
|---|---|---|---|
| 3,701,837 | 10/1972 | Fork | 174/50 |
| 3,932,696 | 1/1976 | Fork et al. | 174/48 |
| 4,178,469 | 12/1979 | Fork | 174/48 |
| 4,297,524 | 10/1981 | Fork | 174/48 |
| 4,335,269 | 6/1982 | Haskins | 174/48 |
| 4,338,484 | 7/1982 | Littrell | 174/48 |
| 4,454,692 | 6/1984 | Ault | 52/221 |
| 4,603,523 | 8/1986 | Albrecht et al. | 52/221 |

OTHER PUBLICATIONS

H. H. Robertson Co., Drawing No. L-856, dated Mar. 27, 84 & Titled: "Tapmate IV-FN-H (In Cavity) QL-GKX-24 (or-30)-2½ Concrete Cover, Carpet Surfaced Floors", Rev. 2.
H. H. Robertson Co., Drawing No. L-869, dated May 9, 84 & Titled: "Tapmate IV-Receptacle, Horizontal Mounting Strap", Cat. No. KED-HMS-S, Rev. 1.
H. H. Robertson Co., Drawing No. L-910, dated Jul. 10, 84 & Titled: "Tapmate IV Duplex Receptical, Horizontal Mounting Plate", Cat. No. KED-HMC.

Primary Examiner—A. T. Grimley
Assistant Examiner—David A. Tone
Attorney, Agent, or Firm—G. E. Manias

[57] ABSTRACT

An improved receptacle support assembly is provided for use within a chamber of a preset access housing which provides access to three services including power, telephone and computer services. The assembly can accommodate four duplex receptacles providing eight outlets or two triplex and two duplex receptacles providing ten outlets. The receptacles are supported horizontally for easy connection and disconnection of electrical plugs.

6 Claims, 5 Drawing Figures

RECEPTABLE SUPPORT ASSEMBLY

BACKGROUND OF THE INVENTION

This invention relates to an underfloor access housing providing access to a plurality of electrical services at one location in the floor of a building, and more particularly to an improved support assembly for supporting plural electrical receptacles.

Floor constructions are known comprising a metal subfloor supporting an overlying layer of concrete. The metal subfloor includes metal cellular flooring units providing generally parallel enclosed cells or raceways. Sets of access holes, usually prepunched at the factory, are provided for gaining access to the wiring extended through the raceways or cells. A preset access housing is installed over each set of access holes. The concrete is then poured over the metal subfloor and the housings. Initally, only a small number of the housings may actually be used. However, since the number and location of housings used may vary substanially over the life span of the building, housings are provided throughout the floor area.

When an access housing is activated, at least one and at most two electrical receptacles are supported within the housing. The receptacles have been supported by vertical partitions, see for example U.S. Pat. Nos. 3,701,837 (FORK), 3,932,696 (FORK et al), 4,335,296 (HASKINS), and 4,454,692 (AULT). Because of the limited space within the housing, such vertical presentation of the receptacle is not condusive to easy connection and disconnection of electrical plugs.

To render connection and disconnection of plugs relatively easier, receptacles have been supported horizontally and generally flush with the upper surface of the floor, see for example U.S. Pat. No. 4,178,469 (FORK) and 4,338,484 (LETTRELL). Such an arrangement is limited in that at most two receptacles can be presented.

SUMMARY OF THE INVENTION

The principal object of this invention is to provide an improved support assembly capable of providing ten horizontally presented outlets at each work station in a floor structure.

Another object of this invention is to provide an improved support assembly presenting upper receptacles for normal power requirements and lower receptacles which are isolated ground receptacles for the power requirements of computer terminals.

Another object of this invention is to provide an improved support assembly arrangement which utilizes the trough spaces on either side of the central cell to house receptacles.

The present invention provides improvements in a receptacle support assembly of the type used in an in-floor electrical wiring distribution system wherein the assembly comprises spaced-apart vertical walls and a receptacle cover extending generally horizontally between the walls. In accordance with this invention, one or both of the walls is provided with a receptacle mounting plate which extends laterally outwardly from the wall generally parallel with the cover. The plate terminates in a downwardly depending outer wall. The mounting plate is adapted to support a receptacle for horizontal presentation.

The present improved support assembly finds particular utility in the access housing arrangement disclosed in U.S. Pat. No. 4,603,523 issued to ALBRECHT et al. on Aug. 5, 1986 and assigned to the assignee of this invention. The ALBRECHT et al. arrangement provides a wiring distributing unit of the type comprising of a cellular unit providing generally parallel enclosed cells separated by troughs and including lateral cells and a central cell therebetween. The height of the central cell is less than that of the lateral cells. A housing comprising an upper wall having an access opening and perimeter walls depending therefrom, spans between the lateral cells across the central cell and cooperates with the cellular unit to form a chamber. A receptacle support assembly residing within the chamber above the central cell, comprises spaced-apart vertical walls and a receptacle cover extending therebetween. In accordance with this invention, an angle shaped extension of one of the vertical walls includes a top wall adapted to support a receptacle, and a depending outer wall. The top wall extends toward one of the lateral cells. The arrangement is such that the extension cooperates with confronting portions of the housing and of the cellular unit to form a compartment segregated from the remainder of the chamber. A second angle shaped extension may be provided along the other of the vertical walls.

DESCRIPTION OF THE PREFERRED EMBODIMENT(s)

Figure 1:
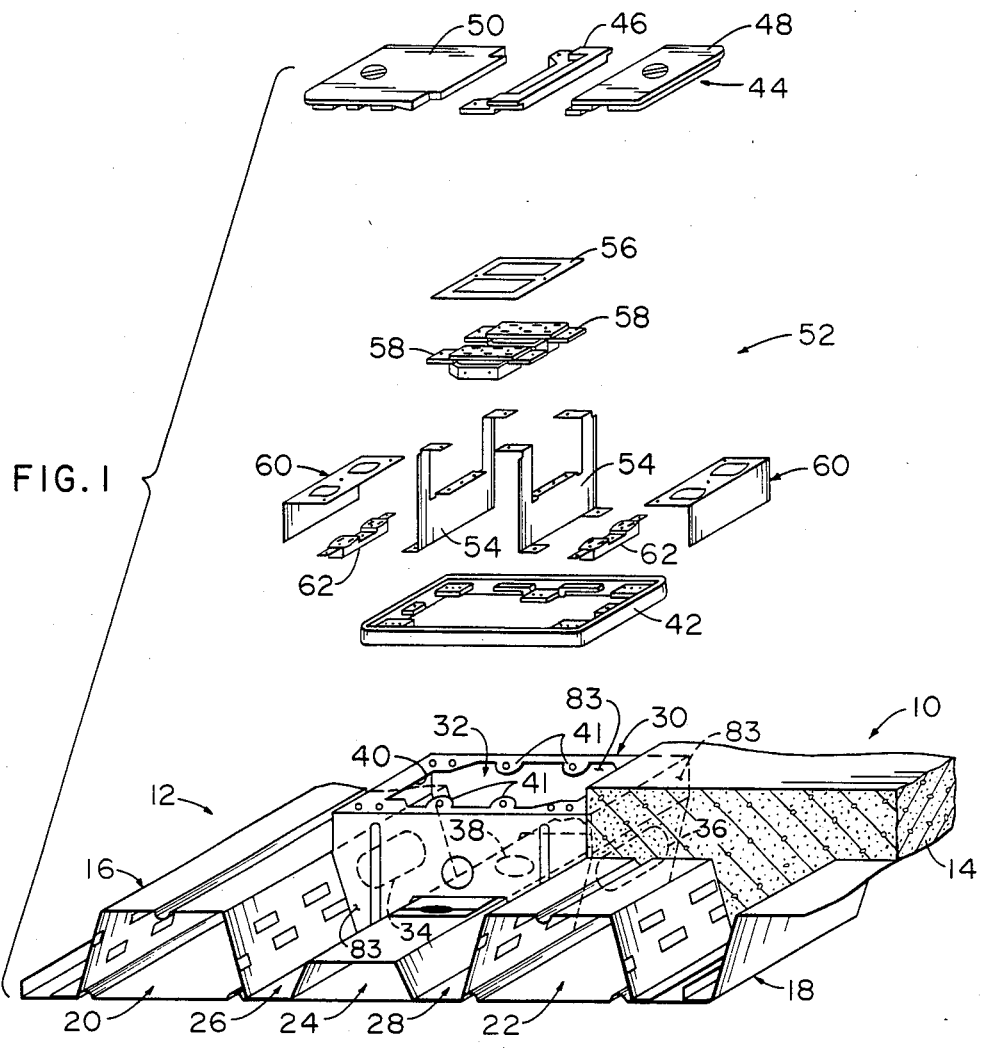
FIG. 1 is an exploded isometric view illustrating a floor structure and means for activating a preset access housing including components of the present support assembly.

FIG. 1 illustrates a floor structure 10 comprising a metal subfloor 12 and an overlying layer of concrete 14. The metal subfloor 12 includes metal cellular unit 16 and non-cellular corrugated units 18 which are comingled in a preselected pattern to allow for present and future distributions of electrical services throughout the floor structure 10. The metal cellular unit 16 provides generally parallel enclosed cells including lateral cells 20, 22 and a central cell 24 therebetween. The cells 20, 24 and 22 are separated by troughs 26, 28. As illustrated in FIG. 1, the central cell 24 has a height which is less than that of the lateral cells 20, 22.

A housing 30 (FIGS. 1 and 3) comprises a top wall 80 having an outlet opening 40 and depending perimeter walls 83. The housing 30 is installed over and cooperates with the cellular unit 16 to enclose a chamber 32 containing web access openings 34, 36 in the confronting webs of the lateral cells 20,22 and a crest access opening 38 in the crest of the central cell 24. The outlet opening 40 provides access into the interior of the chamber 32. During activation, a finishing ring 42 is installed flush with the upper surface of the concrete 14 and receives closure means 44 for gaining access to the chamber 32. The closure means 44 includes a stationary central element 46 and removable cover elements 48, 50.

A receptacle support assembly 52 is provided for introduction into the cavity 32 when the housing 30 is activated. The assembly 52 includes spaced-apart vertical walls 54, a receptable cover 56 adapted to overlie receptacles such as the triplex receptacles 58. In accordance with this invention, angle-shaped extensions 60 of the vertical walls 54 are provided each of which is adapted to support a receptacle such as the duplex receptacle 62.

Figure 2:
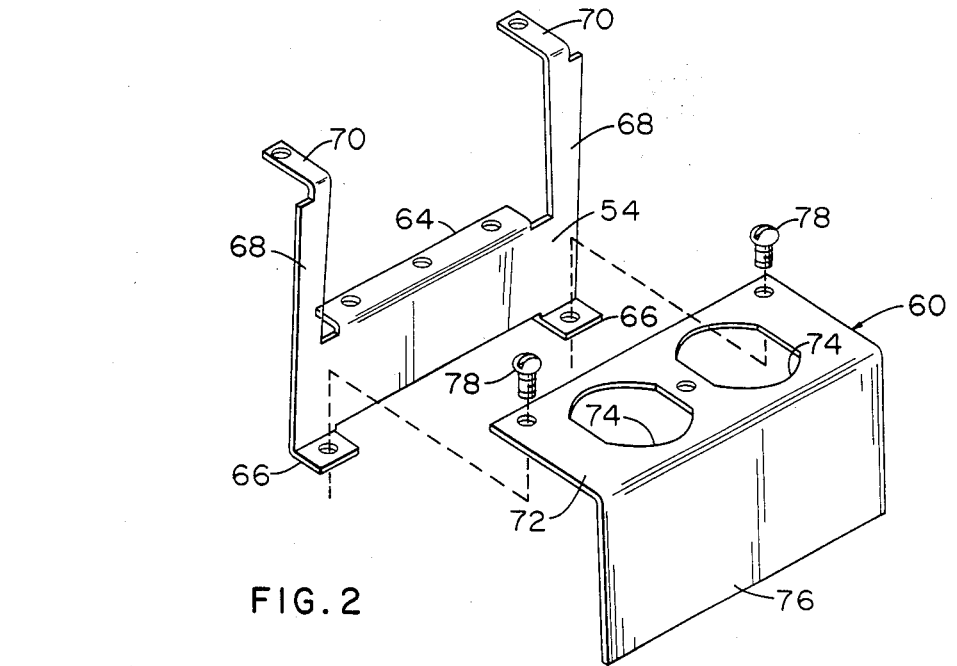
FIG. 2 is an exploded isometric view of one vertical wall of the present support assembly and of a receptacle mounting plate associated therewith.

Referring to FIG. 2, each vertical wall 54 includes and inwardly extending flange 64 along its upper edge to which the ends of the receptacles 58 and the cover 56 are secured. Each vertical wall 54 additionally includes outwardly extending lugs 66 along its lower edge. Each wall 54 is provided with means for suspending the wall 54 from a support disposed above the wall 54. The suspending means includes arms 68 entending upwardly from the wall 54 and terminating an inwardly directed end portions 70. The end portions 70 overlie and are secured to tabs 41 (FIGS. 1 and 3) presented at the periphery of the outlet opening 40 of the housing 30.

The angle-shaped extension 60 includes a receptacle mounting plate 72 having openings 74 adapted to receive the outlets of a duplex receptacle, and having a downwardly depending outer wall 76. When assembled, the mounting plate 72 is supported along one edge by the lugs 66, fasteners 78 being employed to secure the extension 60 to the lugs 66.

Figure 3:
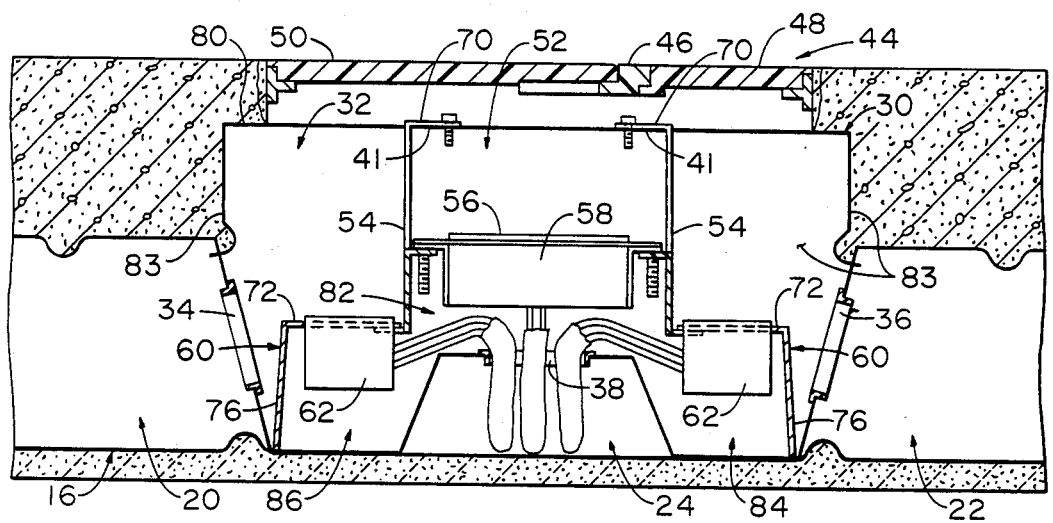
FIG. 3 is a cross-sectional view taken along the line 3—3 of FIG. 4.

As can be seen in FIG. 3, the support assembly 52 is suspended from the top wall 80 of the housing 30. The spacedapart sidewalls 54 and the cover 56 cooperate with confronting portions of the central cell 24 and of the housing 30 to form a first compartment 82 containing the triplex receptacles 58. The mounting plate 72 of each of the extensions 60 extends laterally from the associated wall 54 toward the adjacent lateral cell 20, 22, whereas the outer wall 76 depends downwardly therefrom toward the cellular unit 16. Each of the extensions 60 cooperates with confronting portions of the housing 30 and of the cellular unit 16 to form an additional compartment 84, 86 which is segregated from the remainder of the chamber 32.

Figure 4:
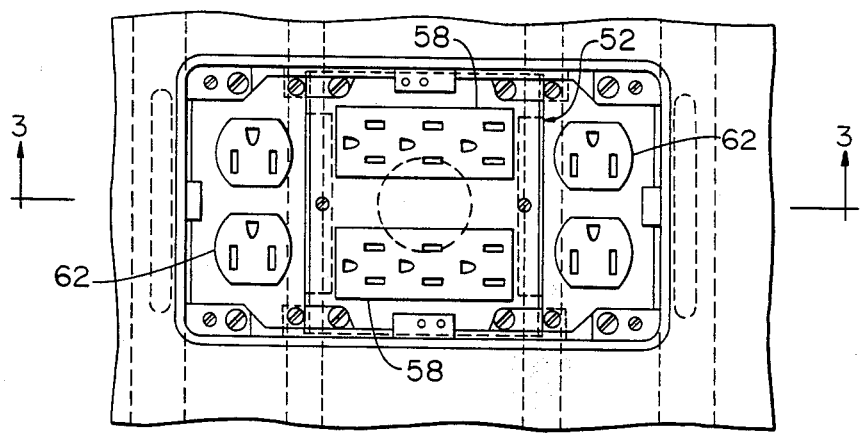
FIG. 4 is a fragmentary plan view of the activated preset access housing of FIG. 1 with closure means removed, illustrating the presentation of two triplex and two duplex receptacles.

The overall arrangement is such that as shown in FIG. 4, two triplex receptacles 58 and two duplex receptacles 62 are presented horizontally for easy connection and disconnection of electrical plugs. In FIG. 4, a total of ten outlets are available for use.

Figure 5:
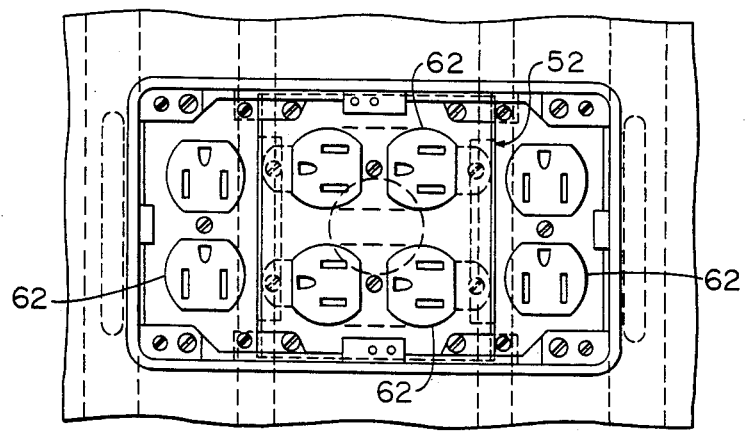
FIG. 5 is a plan view, similiar to FIG. 4, illustrating the support of four duplex receptacles.

As seen in FIG. 5, the support assembly 52 supports four duplex receptacles 62 thereby providing eight outlets for connection and disconnection of electrical plugs.

I claim:

1. In a receptacle support assembly for use with an infloor electrical wiring distribution system, said assembly comprising: spaced-apart vertical walls, and a receptacle cover extending generally horizontally between said walls, the improvement comprising:
    a receptacle mounting plate extending laterally outwardly from one of said walls in a direction away from the other of said walls and lying generally parallel with said cover, said plate terminating in a downwardly depending outer wall.

2. The assembly as defined in claim 1 including a second receptacle mounting plate extending laterally outwardly from the other said walls generally parallel with said cover, said second receptacle mounting plate terminating in a downwardly depending outer wall.

3. The assembly as defined in claim 1 including lug means extending outwardly from said one of said walls, said receptacle mounting plate being supported along one edge by said lug means.

4. The assembly as defined in claim 3 including lugs extending outwardly from the other of said walls, and a second receptacle mounting plate including a top wall supported along one edge by said lugs and an outer wall depending from another edge of said top wall.

5. In a wire distributing unit of the type comprising a cellular unit providing generally parallel enclosed cells separated by troughs and including lateral cells and a central cell therebetween, the height of said central cell being less than that of said lateral cells; a housing comprising an upper wall having an access opening, and perimeter walls depending therefrom, said housing spanning between said lateral cells across said central cell and cooperating with said cellular unit to form a chamber; and a receptacle support assembly residing within said chamber above said central cell and comprising spaced-apart vertical walls, and a receptacle cover extending therebetween; the improvement comprising:
    an angle-shaped extension of one of said vertical walls including a mounting plate adapted to support a receptacle and a depending outer wall, said mounting plate extending toward one of said lateral cells, said extension cooperating with confronting portions of said housing and of said cellular unit to form a compartment segregated from the remainder of said chamber.

6. The unit as defined in claim 5 wherein the other of said vertical walls includes an angle shaped extension including a top wall and a depending outer wall, the second said top wall being adapted to support a receptacle and extending toward the other of said lateral cells, the second said extension cooperating with confronting portions of said housing and of said cellular unit to form a second compartment segregated from the remainder of said chamber.

* * * * *